(12) United States Patent
Iseri et al.

(10) Patent No.: US 9,859,535 B2
(45) Date of Patent: Jan. 2, 2018

(54) POUCH-TYPE BATTERY AND METHOD OF MANUFACTURING THE SAME

(71) Applicant: Panasonic Intellectual Property Management Co., Ltd., Osaka (JP)

(72) Inventors: Mitsuhiro Iseri, Osaka (JP); Tomohiro Ueda, Osaka (JP); Yuya Asano, Osaka (JP); Haruhisa Yagi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 132 days.

(21) Appl. No.: 14/864,439

(22) Filed: Sep. 24, 2015

(65) Prior Publication Data
US 2016/0093839 A1    Mar. 31, 2016

(30) Foreign Application Priority Data

Sep. 30, 2014    (JP) .................................. 2014-201591
Jan. 8, 2015    (JP) .................................. 2015-002586

(51) Int. Cl.
*H01M 2/02*    (2006.01)

(52) U.S. Cl.
CPC .......... *H01M 2/0275* (2013.01); *H01M 2/021* (2013.01); *H01M 2/0207* (2013.01); *H01M 2/0287* (2013.01); *H01M 2002/0205* (2013.01)

(58) Field of Classification Search
CPC ............................ H01M 2/021; H01M 2/0275
USPC ........................................................ 429/127
See application file for complete search history.

(56) References Cited

U.S. PATENT DOCUMENTS

| | | |
|---|---|---|
| 2009/0129706 A1 | 5/2009 | Otsuka et al. |
| 2012/0064391 A1 | 3/2012 | Fukaya et al. |
| 2012/0107428 A1 | 5/2012 | Schneidmiller et al. |
| 2012/0183825 A1 | 7/2012 | Lee et al. |

(Continued)

FOREIGN PATENT DOCUMENTS

| | | |
|---|---|---|
| CN | 102403542 A | 4/2012 |
| JP | 63-121244 | 5/1988 |

(Continued)

OTHER PUBLICATIONS

English Translation of Chinese Search Report dated Jun. 2, 2017 for the related Chinese Patent Application No. 201510626656.9.

*Primary Examiner* — Basia A Ridley
*Assistant Examiner* — James M Erwin
(74) *Attorney, Agent, or Firm* — Panasonic IP Management; Kerry S. Culpepper

(57) ABSTRACT

There is provided a pouch-type battery that includes an exterior packaging member having an accommodating space in which an electrode and an electrolyte are accommodated and which has a curved shape at least in a first direction. The exterior packaging member includes a first film member on which a cup section having the accommodating space inside is provided, a second film member disposed to face the first film member, and a sealing section around the cup section, with which the first and second film members are bonded to each other and the accommodating space is sealed. A top surface of the cup section of the first film member has a curved shape and is provided with a plurality of concave portions or convex portions, and the sealing section has a curved shape in the first direction and is configured of a flat surface on which neither concave portion nor convex portion is provided.

8 Claims, 14 Drawing Sheets

(56) References Cited

U.S. PATENT DOCUMENTS

2013/0101884 A1    4/2013  Ueda
2015/0155528 A1*   6/2015  Takahashi ........... H01M 2/0202
                                                      429/163

FOREIGN PATENT DOCUMENTS

| JP | 2009-238463 | 10/2009 |
| JP | 2012-064337 | 3/2012 |
| WO | 2007/017979 | 2/2007 |
| WO | 2012/140709 | 10/2012 |
| WO | 2012/151110 | 11/2012 |

* cited by examiner

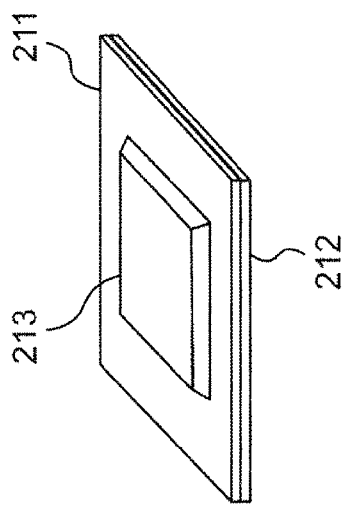
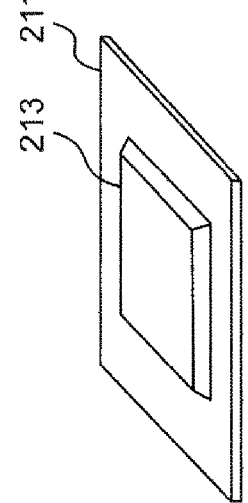
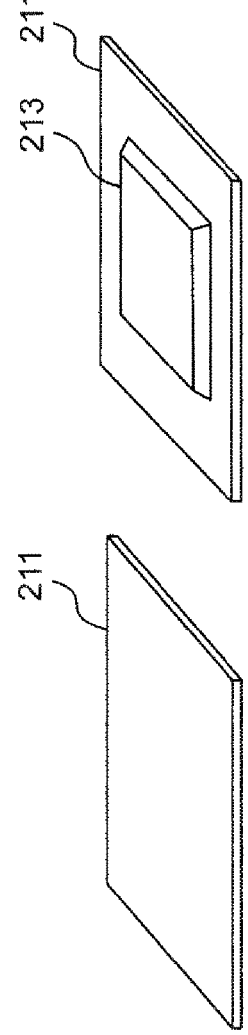
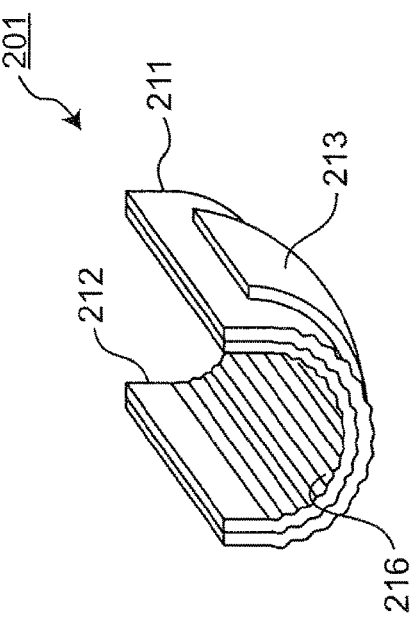
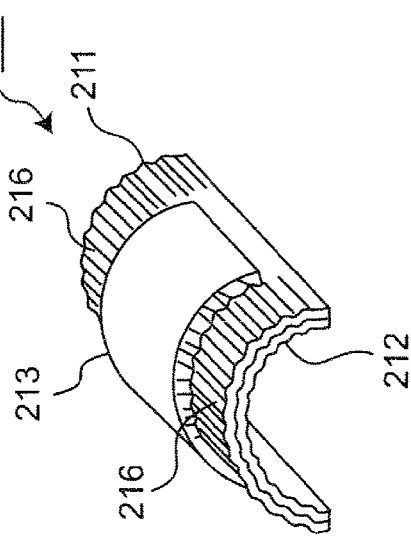

POUCH-TYPE BATTERY AND METHOD OF MANUFACTURING THE SAME

BACKGROUND OF THE INVENTION

1. Field of the Invention

The present disclosure relates to a pouch-type battery and a method of manufacturing the pouch-type battery.

2. Description of Related Art

In the related art, a thin pouch-type battery is used in a compact portable electronic apparatus such as a smart phone.

Such portable electronic apparatuses employ various shapes depending on usage states and the pouch-type battery needs to be thin or flexible so as to be applicable to the portable electronic apparatuses having the various shapes.

Therefore, in the pouch-type battery in the related art, it is proposed that a corrugated section is formed on an entire film-like exterior packaging member such that high flexibility of the entire exterior packaging member is achieved. In addition, in a bonding section (sealing section) between the exterior packaging members, it is proposed that crest portions and trough portions which constitute the corrugated sections are overlapped with each other such that high reliability of the sealing between the exterior packaging members is achieved (for example, see International publication No. WO2012/140709).

In recent years, a wearable portable terminal which is used by being worn on a part of a human body has attracted attention as a portable electronic apparatus. For example, since a wristwatch-type wearable portable terminal which is worn around a wrist has a curved form to match the surface of the wrist, a built-in pouch-type battery needs to have a curved shape. In the pouch-type battery having such a curved shape, since the exterior packaging members, in which an electrode and an electrolyte are contained, have the curved shape, themselves, the sealing section between the exterior packaging members also needs to have the curved shape such that reliability of the sealing thereof is improved.

In addition, when an external force is applied to cause the pouch-type batteries having a planar shape instead of the curved shape to be curved, the sealing section between the exterior packaging members comes to have a curved shape as a consequence. Therefore, even in this case, high reliability of the sealing needs to be achieved.

SUMMARY OF THE INVENTION

An object of the present disclosure is to provide a pouch-type battery in which it is possible to improve reliability of sealing of exterior packaging members and a method of manufacturing the pouch-type battery.

In order to achieve the object, the pouch-type battery and the method of manufacturing the pouch-type battery according to the present disclosure are configured as follows.

An aspect of the present disclosure provides a pouch-type battery including: a sheet-shaped electrode; an electrolyte; and an exterior packaging member having an accommodating space in which the electrode and the electrolyte are accommodated. The exterior packaging member includes a first film member on which a cup section having the accommodating space inside is provided, a second film member disposed to face the first film member, and a sealing section around the cup section, with which the first and second film members are bonded to each other and the accommodating space is sealed. In addition, the cup section of the first film member has a top surface on which a plurality of concave portions or convex portions are provided and the sealing section is configured of a flat surface on which neither concave portion nor convex portion is provided.

Another aspect of the present disclosure provides a method of manufacturing a pouch-type battery that includes: shaping, on a first film member, a cup section having a top surface on which a plurality of concave portions or convex portions are provided; accommodating a sheet-shaped electrode and an electrolyte in an accommodating space inside the cup section of the first film member, disposing a second film member to face the first film member, and sealing the accommodating space by bonding the first and second film members to each other at a sealing section around the cup section; and then, shaping the top surface of the cup section of the first film member in a curved shape by causing the first and second film members to be curved at least in a first direction and shaping the sealing section parallel to the first direction, which is configured of a flat surface on which neither concave portion nor convex portion is provided, in a curved shape.

The present disclosure can provide a pouch-type battery and a method of manufacturing the pouch-type battery in which reliability of sealing of exterior packaging members can be improved.

BRIEF DESCRIPTION OF THE DRAWINGS

FIGS. 2A to 2E are views illustrating a method of shaping an exterior packaging member in a curved shape, after a cup section is formed on the exterior packaging member, according to another comparative example of the present disclosure.

DESCRIPTION OF EMBODIMENTS

Basic Findings for Present Disclosure

After a close study of a curved pouch-type battery having a curved shape, the inventors of the present application find a new problem (new finding) in that, when the curved shape is formed, the sealing section of the exterior packaging member is wrinkled in an unpredictable manner and thus, reliability of sealing of the exterior packaging members having the curved shape is lowered. The new problem will be described below.

First, in a case where a curved pouch-type battery having a curved shape is manufactured, two methods are considered including a method in which an exterior packaging member is shaped to have the curved shape and then a cup section, inside which an accommodating space of an electrode or the like is formed, is shaped on the exterior packaging member, and the other method in which a cup section is shaped on the exterior packaging member and then the exterior packaging member is shaped to have the curved shape.

Here, the method (a comparative example of the present disclosure), in which the exterior packaging member is shaped to have the curved shape and then the cup section is shaped on the exterior packaging member, is described with reference to views in FIGS. 1A to 1F.

Figure 1A:
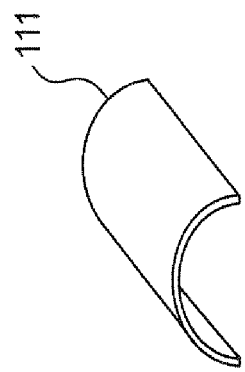
FIGS. 1A to 1F are views illustrating a method of shaping a cup section on an exterior packaging member, after the exterior packaging member is shaped in a curved shape, according to a comparative example of the present disclosure.
Figure 1B:
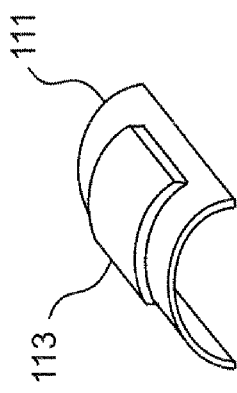
Figure 1C:
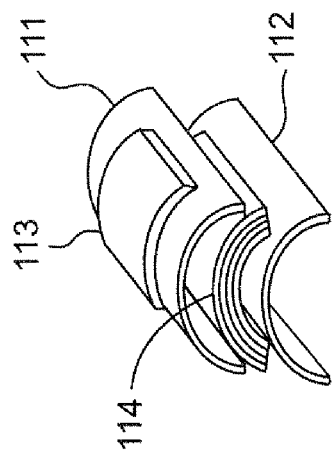
Figure 1D:
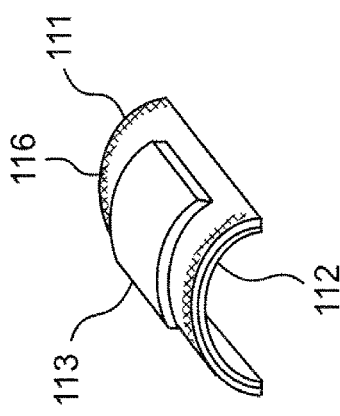
Figure 1E:
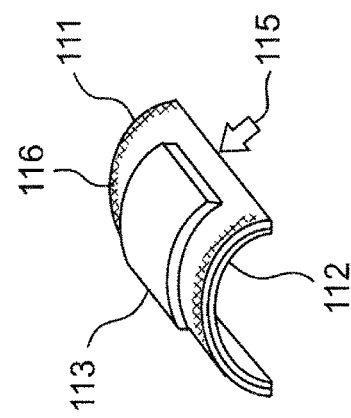
Figure 1F:
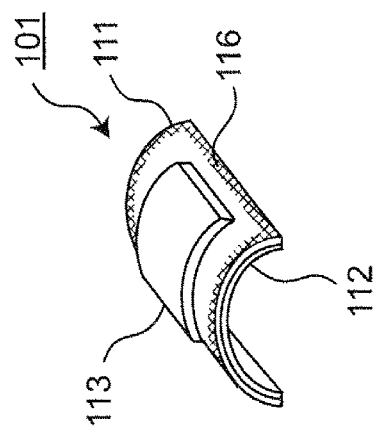

First, first film member 111 constituting the exterior packaging member is bent and is shaped to have a curved shape (refer to FIG. 1A). Next, cup section 113 having an accommodating space inside is shaped on a curved surface of first film member 111 (refer to FIG. 1B). Second film member 112 shaped to have the curved shape in a similar way and electrode 114 are overlapped with first film member 111 and electrode 114 is accommodated in the accommodating space of cup section 113 (refer to FIG. 1C). Then, an overlap section of film members 111 and 112 at three sides around cup section 113 is sealed (refer to FIG. 1D) and then, electrolyte liquid (electrolyte) 115 is injected into the accommodating space from an end surface of the remaining one side (refer to FIG. 1E). Finally, the end surface is sealed, film members 111 and 112 on the outer side of sealing section 116 around cup section 113 are cut such that an external shape is trimmed, and thereby, curved pouch-type battery 101 having a curved shape is completely made.

However, in the method in which the exterior packaging member is shaped to have the curved shape and then, the cup section is shaped on the exterior packaging member as illustrated in FIGS. 1A to 1F, the exterior packaging member is, first, shaped to have the curved shape. As a result, in the subsequent process, members (film members 111 and 112 or the like) having the curved shape are transported. Hence, a problem arises in that transportability of the members deteriorates. In addition, in a process of overlapping film members 111 and 112, problems arise in that the curved shapes of the respective members need to be the same and time and effort is required to match the positions thereof during the overlapping. Further, a problem arises in that a sealing process of the exterior packaging members needs to be performed through bonding the film members having the curved shape to each other in an accurate manner and thus, it is difficult to improve reliability of the sealing. In addition, a problem arises in that it is not possible to inject the electrolyte liquid uniformly into the accommodating space because the injection of the electrolyte liquid needs to be performed in a state in which the exterior packaging member has the curved shape.

Under such a condition, from a viewpoint of improving productivity, reliability of sealing, and a battery performance, the inventors of the present application are led to a consideration that it is desirable that the method, in which the cup section is formed on the exterior packaging member and then, the exterior packaging member is shaped to have the curved shape, is applied to manufacture the curved pouch-type battery. Here, the method (a comparative example of the present disclosure), in which the cup section is formed on the exterior packaging member and then, the exterior packaging member is shaped to have the curved shape, is described with reference to FIGS. 2A to 2E.

First, first film member 211 having a flat shape and constituting the exterior packaging member is prepared (refer to FIG. 2A) and cup section 213 is formed on flat first film member 211 (refer to FIG. 2B). Second film member 212 shaped to have the flat shape in a similar way and an electrode are overlapped with first film member 211 and the electrode is accommodated in the accommodating space of cup section 213 (refer to FIG. 2C). Then, an overlapping section of film members 211 and 212 at three sides around cup section 213 is sealed, an electrolyte liquid is injected into the accommodating space from an end surface of the remaining one side, and then, the end surface is sealed. Then, the exterior packaging member is bent to have the curved shape and curved pouch-type battery 201 having a curved shape is completely made (refer to FIG. 2D).

However, as illustrated in FIG. 2D, when the exterior packaging member, on which cup section 213 is shaped, is shaped to have the curved shape, it turns out that a surface of film member 211 around cup section 213 is wrinkled, particular in sealing section 216. In addition, as illustrated in FIG. 2E, it turns out that a surface of second film member 212 is also wrinkled.

It is not possible to predict such a form of the wrinkle, and particularly, sealing section 216 corresponding to the bonding section of first film member 211 and second film member 212 is wrinkled in an unpredictable manner. When the section, at which the sealing is performed, is wrinkled, there is a possibility that the sealing section is likely to be peeled off and thus reliability of the sealing deteriorates. There is a concern that the electrolyte liquid inside will leak (liquid leakage) through a peeled portion.

In this manner, the inventors of the present application have found new problems in the curved pouch-type battery having curved shape in that wrinkling is generated on the surface of the film member when the exterior packaging member is shaped to have the curved shape and deterioration of the reliability of the sealing of the exterior packaging member due to the wrinkling, and the inventors provide the present disclosure as a solution to the problems.

A case, in which an external force is applied to cause the planar pouch-type battery having a planar shape to have a curved shape later in time, also has a common problem of wrinkling of a surface of a film member and deterioration of reliability of the sealing of an exterior packaging member due to the wrinkling.

Aspects of Present Disclosure

A first aspect of the present disclosure provides a pouch-type battery including: a sheet-shaped electrode; an electrolyte; and an exterior packaging member having an accommodating space in which the electrode and the electrolyte are accommodated. The exterior packaging member includes a first film member on which a cup section having the accommodating space inside is provided, a second film member disposed to face the first film member, and a sealing section around the cup section, with which the first and second film members are bonded to each other and the accommodating space is sealed. In addition, the cup section of the first film member has a top surface on which a plurality of concave portions or convex portions are provided and the sealing section is configured of a flat surface (even surface) on which neither concave portion nor convex portion is provided.

A second aspect of the present disclosure provides the pouch-type battery according to the first aspect, in which the accommodating space in the exterior packaging member has a curved shape at least in a first direction, the top surface of the cup section of the first film member has a curved shape and is provided with the plurality of concave portions or convex portions, and the sealing section has a curved shape in the first direction and is configured of the flat surface on which neither concave portion nor convex portion is provided.

A third aspect of the present disclosure provides the pouch-type battery according the first aspect, in which the top surface of the cup section of the first film member has a planar shape and is provided with the plurality of concave portions or convex portions and the sealing section has a planar shape in the first direction and is configured of the flat surface on which neither concave portion nor convex portion is provided.

A fourth aspect of the present disclosure provides the pouch-type battery according to any one of the first to third aspects, in which the plurality of concave portions or convex portions extend in a second direction intersecting with the first direction, on the top surface of the cup section of the first film member.

A fifth aspect of the present disclosure provides the pouch-type battery according to the fourth aspect, in which the plurality of concave portions or convex portions extend from one end to the other end of the top surface of the cup section of the first film member.

A sixth aspect of the present disclosure provides the pouch-type battery according to the fourth or fifth aspect, in which the top surface of the cup section of the first film member has a corrugation structure in which concave portions and convex portions are alternately disposed in the first direction.

A seventh aspect of the present disclosure provides the pouch-type battery according to sixth aspect, in which, in the corrugation structure of the top surface of the cup section of the first film member, a corrugation height on an end side is greater than a corrugation height at the center portion in the first direction.

An eighth aspect of the present disclosure provides the pouch-type battery according to the sixth aspect, in which, in the corrugation structure of the top surface of the cup section of the first film member, a corrugation pitch on an end side is narrower than a corrugation pitch at the center portion in the first direction.

A ninth aspect of the present disclosure provides the pouch-type battery according to any one of the first to eighth aspects, in which the second film member is formed to have a flat surface on which neither concave portions nor convex portions is provided.

A tenth aspect of the present disclosure provides a method of manufacturing a pouch-type battery that includes: shaping, on a first film member, a cup section having a top surface on which a plurality of concave portions or convex portions are provided; accommodating a sheet-shaped electrode and an electrolyte in an accommodating space inside the cup section of the first film member, disposing a second film member to face the first film member, and sealing the accommodating space by bonding the first and second film members to each other at a sealing section around the cup section; and then, shaping the top surface of the cup section of the first film member in a curved shape by causing the first and second film members to be curved at least in a first direction and forming the sealing section parallel to the first direction, which is configured of a flat surface (even surface) on which neither concave portion nor convex portion is provided, in a curved shape.

Embodiments

Hereinafter, embodiments according to the present disclosure will be described in detail based on the drawings. Before a configuration of the pouch-type battery according to an embodiment of a present disclosure is described, a mechanism of wrinkling of a surface of a film member, when an exterior packaging member is bent and is shaped to have a curved shape, is described with reference to FIGS. 3A to 3C.

Figure 3A:
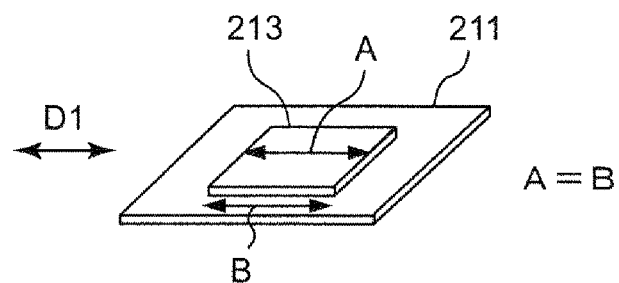
FIGS. 3A to 3C are views illustrating a mechanism of wrinkling of a surface of a film member.

As illustrated in FIG. 3A, first film member 211 constituting the exterior packaging member is described. Cup section 213 as a recessed section constituting the accommodating space is shaped at the center portion of first film member 211. Here, reference sign A represents a surface length of a top surface (that is, a bottom of the recessed section) of cup section 213 in the state of having the flat shape and reference sign B represents a surface length of first film member 211 on the peripheral side of cup section 213, which corresponds to surface length A of cup section 213. These surface lengths A and B are a length of the surface of first film member 211 in first direction D1 corresponding to a direction in which first film member 211 is bent.

Figure 3B:
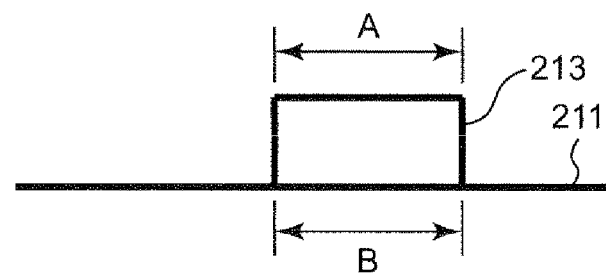
Figure 3C:
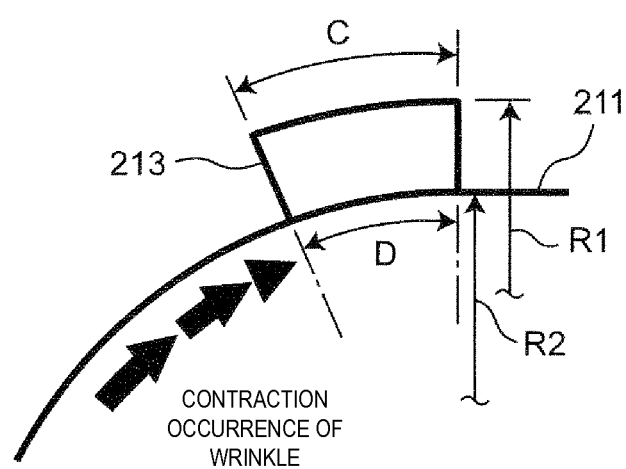

As illustrated in FIG. 3B, in a state in which first film member 211 has the flat shape, surface length A is the same as surface length B. As illustrated in FIG. 3C, when first film member 211 is bent in first direction D1 to have the curved shape, radius of curvature R1 of the curved shape on a surface of cup section 213 is different from radius of curvature R2 of the curved shape on the surface of a peripheral side section of cup section 213 to be R1>R2. Hence, curved length (circumferential length) C (a portion corresponding to surface length A) of the surface of cup section 213 in the curved shape is different from curved length (circumferential length) D (a portion corresponding to surface length B) of the surface of the peripheral side section of cup section 213 in the curved shape to be C>D.

As first film member 211, a metal film member is often used and first film member 211 itself is not formed of a material having high contractility. Hence, it is difficult for curved length (circumferential length) C of the surface of cup section 213 in the curved shape to be further elongated than surface length A at the time of the flat state. As a result, the surface of the peripheral side section of cup section 213 is wrinkled such that the curved length (circumferential length) D of the surface of the peripheral side section of cup section 213 in the curved shape is shorter than surface length B at the time of the flat shape. There is a possibility that the surfaces of the film members 211 and 212 which have the radius of curvature smaller than that of the top surface of cup section 213 is wrinkled similar to the surface of the peripheral side section of cup section 213. This is the mechanism of wrinkling.

Curved Pouch-Type Battery

A configuration of the curved pouch-type battery having the curved shape, as the pouch-type battery according to an embodiment of the present disclosure, will be described with reference to a view of an external appearance in FIG. 4.

Figure 4:
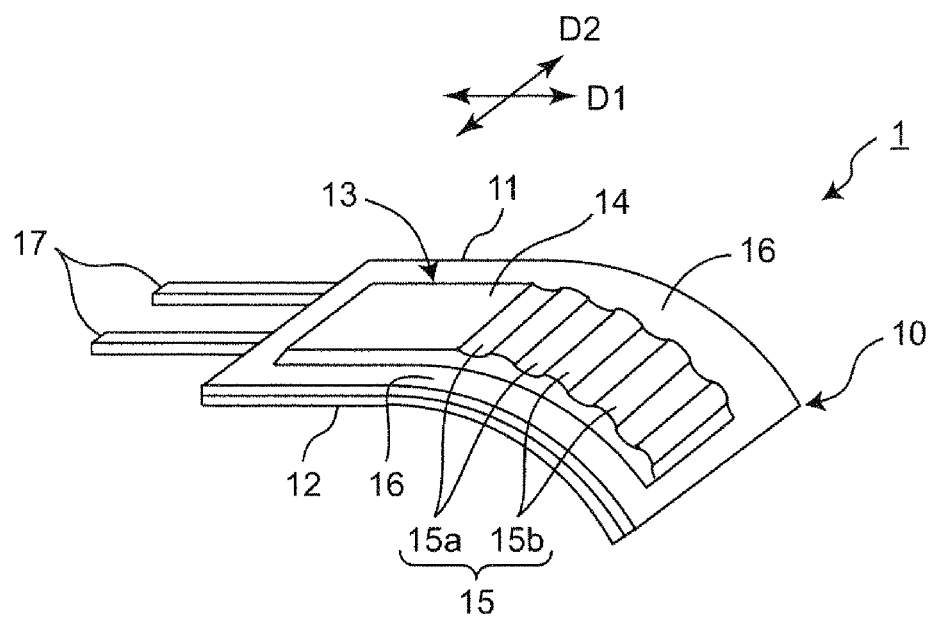
FIG. 4 is a view illustrating an external appearance of a curved pouch-type battery having a curved shape according to an embodiment of the present disclosure.

As illustrated in FIG. 4, curved pouch-type battery 1 of the present embodiment includes exterior packaging member 10 in which first film member 11 and second film member 12 are bonded and inside which an accommodating space is formed, and a sheet-shaped electrode and an electrolyte liquid (electrolyte) which are accommodated in the accommodating space.

Exterior packaging member 10 has a substantially quadrangular sheet shape and the accommodating space has a curved shape in first direction D1. Specifically, the exterior packaging member 10 has a curved shape in a right-hand section in the drawing in first direction D1 and a planar section which is not curved, in a left-hand section in the drawing. In the present embodiment, a case where the exterior packaging member 10 partially has the curved shape is described as an example; however, a case where the exterior packaging member 10 is entirely curved in first direction D1 may be employed.

First film member 11 has cup section 13 of which the center portion is formed (formed as a recessed section toward the lower side) to protrude toward the upper side. The accommodating space is provided inside the cup section 13. Cup section 13 is formed to substantially extend in first direction D1. First film member 11 including cup section 13 has the curved shape in first direction D1.

A section (right side section in the first direction) having the curved shape on top surface 14 (top surface of a protrusion shape and the bottom of the recessed section) of cup section 13 has corrugation structure 15 in which a plurality of concave portions 15a and convex portions 15b are alternately disposed. Specifically, the plurality of concave portions 15a and convex portions 15b are formed to extend from one end to the other end of top surface 14 in second direction D2 corresponding to a direction orthogonal to first direction D1. In addition, concave portions 15a and convex portions 15b are alternately disposed in first direction D1. In a configuration illustrated in FIG. 4, respective concave portion 15a and convex portion 15b are formed to have substantially the same corrugation height and are disposed at a certain corrugation pitch in first direction D1. In the configuration illustrated in FIG. 4, corrugation structure 15 is formed only in the section having the curved shape on top surface 14; however, the corrugation structure may also be formed in the planar section of top surface 14.

Second film member 12 is formed of a flat surface on which neither the concave portion nor the convex portion is provided, and has the curved shape in first direction D1. Sealing characteristics of preventing the electrolyte liquid accommodated in the accommodating space from leaking and resistance to damage due to an external force are required for first film member 11 and second film member 12. Respective film members 11 and 12 are configured of, for example, a metal film material and, in the present embodiment, for example, an aluminum film member having top and under surfaces which are coated with resin layers, respectively, is used.

Second film member 12 is overlapped with first film member 11 and first film member 11 and second film member 12 are bonded to each other around cup section 13. The bonding section becomes sealing section 16 with which the accommodating space is sealed from the outside of the battery and sealing section 16 is provided to be continuous in a quadrangular shape so as to completely surround (around the entire four sides of) cup section 13. The surfaces of first film member 11 and second film member 12 which constitute sealing section 16 are configured of flat surfaces on which neither the concave portion nor the convex portion is provided.

Two terminals 17 are provided on one side of the substantially quadrangular shape of exterior packaging member 10 and respective terminals 17 are electrically connected to the built-in electrode (not illustrated) in exterior packaging member 10.

Curved pouch-type battery 1 of the present embodiment having such a configuration can be used for various thin and curved electronic apparatuses such as a wristwatch-type wearable portable terminal.

Next, a method of manufacturing curved pouch-type battery 1 of the present embodiment will be described with reference to views illustrating processes in FIG. 5A to FIG. 5I.

Figure 5A:
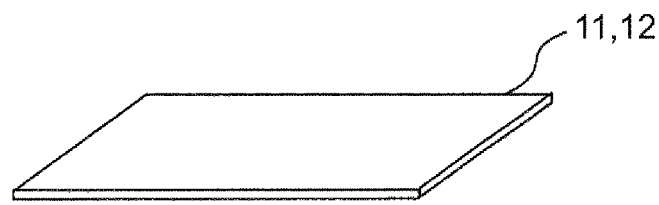
FIG. 5A is a view illustrating a process of a method of manufacturing the curved pouch-type battery of the embodiment.

As illustrated in FIG. 5A, the aluminum film member which is coated with a resin is cut into a predetermined shape such that first film member 11 and second film member 12 are prepared.

Figure 5B:
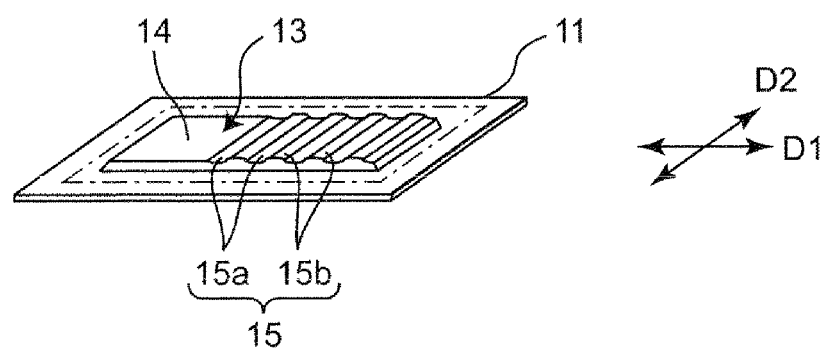
FIG. 5B is a view illustrating a process of the method of manufacturing the curved pouch-type battery of the embodiment.

Next, as illustrated in FIG. 5B, cup section 13 is shaped on the surface of first film member 11. A shaping process of cup section 13 is performed through performing emboss shaping in which a predetermined die (not illustrated) presses the surface of first film member 11.

Figure 5C:
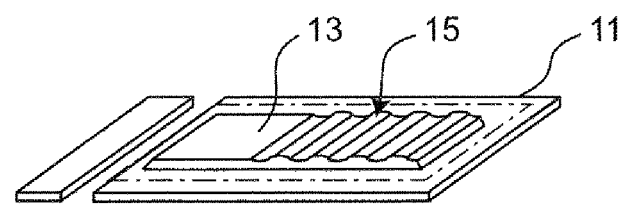
FIG. 5C is a view illustrating a process of the method of manufacturing the curved pouch-type battery of the embodiment.
Figure 6A:
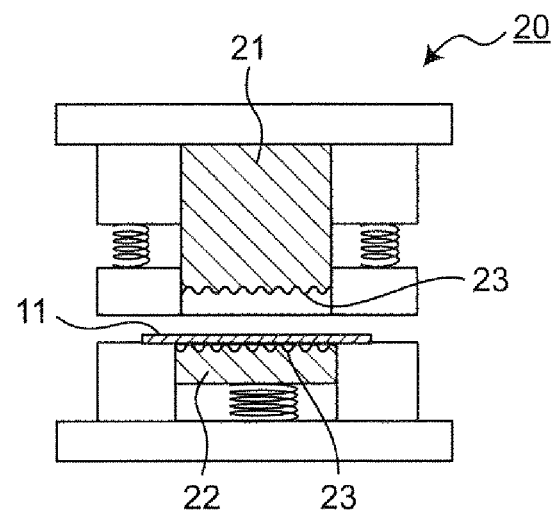
FIG. 6A is a view illustrating a shaping process of a cup section and a corrugation structure.
Figure 6B:
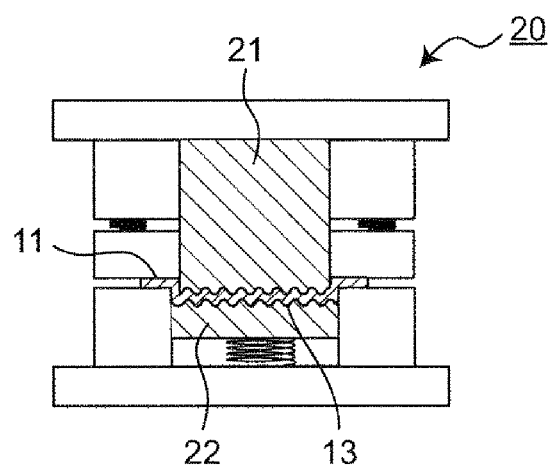
FIG. 6B is a view illustrating the shaping process of the cup section and the corrugation structure.
Figure 6C:
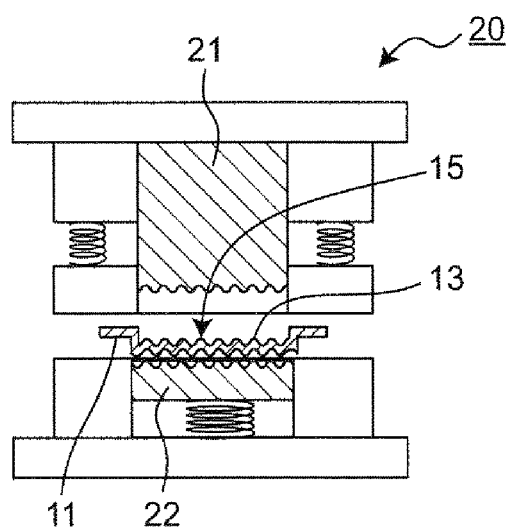
FIG. 6C is a view illustrating the shaping process of the cup section and the corrugation structure.
Figure 7A:
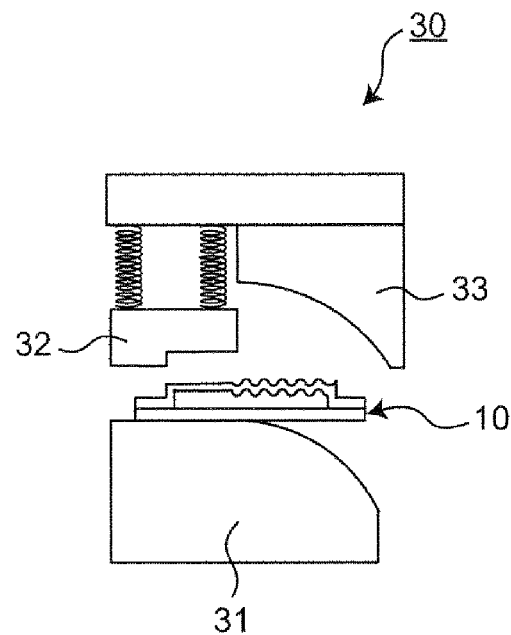
FIG. 7A is a view illustrating a curve shaping process of an exterior packaging member.
Figure 7B:
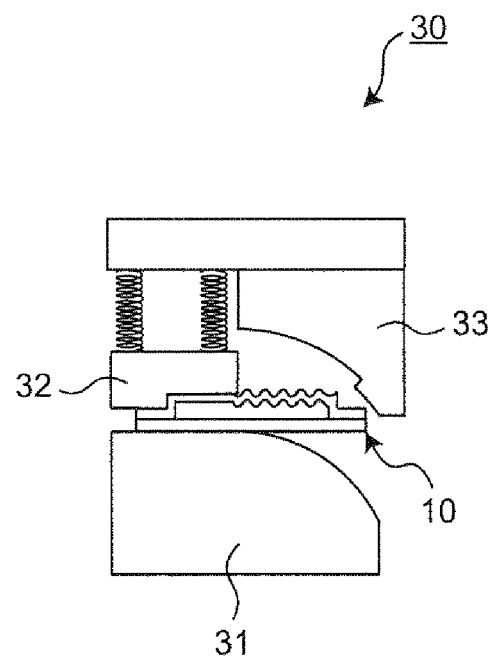
FIG. 7B is a view illustrating the curve shaping process of the exterior packaging member.
Figure 7C:
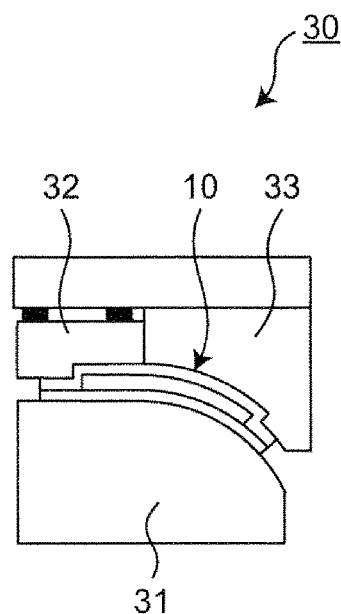
FIG. 7C is a view illustrating the curve shaping process of the exterior packaging member.
Figure 7D:
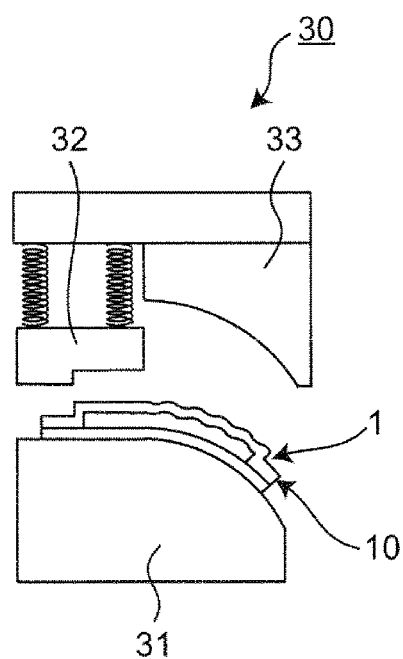
FIG. 7D is a view illustrating the curve shaping process of the exterior packaging member.

Specifically, as illustrated in FIG. 6A, first film member 11 is disposed to be inserted between upper die 21 and lower die 22 in emboss shaping apparatus 20. Upper die 21 and lower die 22 are formed to match the size and shape of cup section 13, and corrugation die 23 having a shape corresponding to corrugation structure 15 is provided on the surface of upper die 21 and lower die 22. As illustrated in FIG. 6B and FIG. 6C, in emboss shaping apparatus 20, upper die 21 and lower die 22 approach relative to each other to press first film member 11 and thereby, cup section 13 is formed to protrude on first film member 11. Simultaneously, corrugation structure 15 is shaped on top surface 14 of cup section 13. As illustrated in FIG. 5B, in corrugation structure 15, concave portions 15a and convex portions 15b which extend in second direction D2 are alternately disposed in the first direction. Then, as illustrated in FIG. 5C, a part of the end surface of first film member 11 is cut such that an external shape is trimmed.

Figure 5D:
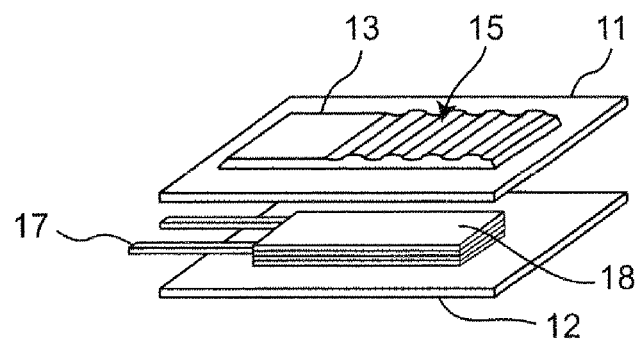
FIG. 5D is a view illustrating a process of the method of manufacturing the curved pouch-type battery of the embodiment.

Next, as illustrated in FIG. 5D, electrode 18 is accommodated in cup section 13 of first film member 11 and first film member 11 and second film member 12 are positioned and overlapped with each other (stacked). The accommodating space matching the shape (or a volume of the electrolyte liquid) of electrode 18, which is accommodated, is provided inside cup section 13. In a state in which electrode 18 is accommodated in the accommodating space, an opening (opening of the recessed section) of cup section 13 is covered with second film member 12. For example, sheet-shaped electrode 18 has a stack structure in which a sheet-shaped positive electrode and a sheet-shaped negative electrode are stacked and an electrolyte layer (formed of a sheet-shaped separator impregnated with an electrolyte) is interposed between the electrodes, and electrode 18 can be referred to as an electrode assembly.

Figure 5E:
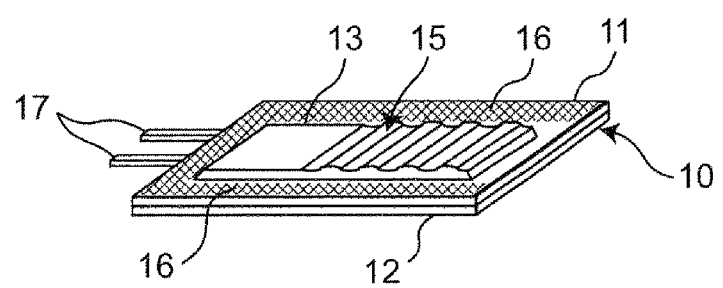
FIG. 5E is a view illustrating a process of the method of manufacturing the curved pouch-type battery of the embodiment.

Then, as illustrated in FIG. 5E, first film member 11 and second film member 12 are bonded at three sides around cup section 13 and sealing section 16 is formed. The bonding between film members 11 and 12 is performed by melting and solidifying resin layers on the film member surfaces, for example, through thermocompression bonding; however, another bonding method such as bonding with adhesive may be employed. The bonding between film members 11 and 12 is performed in a state in which the two terminals electrically connected to electrode 18 are positioned on the outside of exterior packaging member 10 configured to have respective film members 11 and 12. In FIG. 5E, a hatched pattern is added at a position corresponding to sealing section 16 on the surface of first film member 11 such that the position, at which sealing section 16 is formed, is easily shown.

Figure 5F:
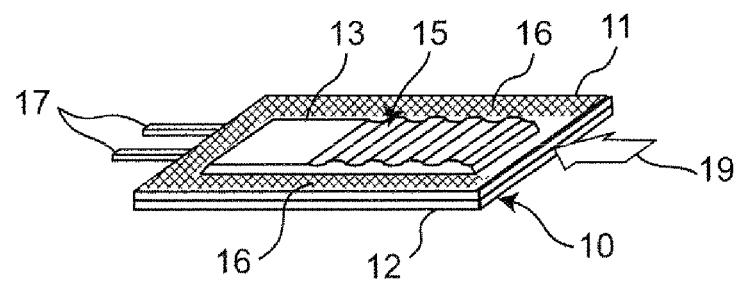
FIG. 5F is a view illustrating a process of the method of manufacturing the curved pouch-type battery of the embodiment.
Figure 5G:
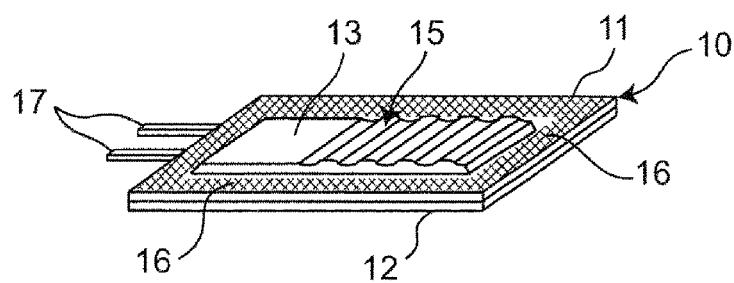
FIG. 5G is a view illustrating a process of the method of manufacturing the curved pouch-type battery of the embodiment.
Figure 5H:
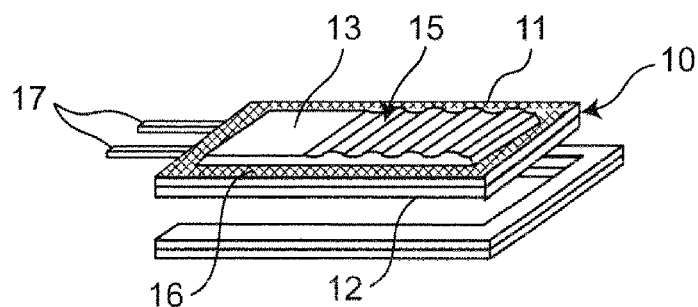
FIG. 5H is a view illustrating a process of the method of manufacturing the curved pouch-type battery of the embodiment.

Next, as illustrated in FIG. 5F, electrolyte liquid 19 is injected into the accommodating space of exterior packaging member 10 from an end surface on one side which is not sealed yet, on exterior packaging member 10. Then as illustrated in FIG. 5G, first film member 11 and second film member 12 are bonded at the end surface on the one side. In this manner, sealing section 16 is formed to completely surround cup section 13 in exterior packaging member 10. Accordingly, in a state in which electrode 18 and electrolyte liquid 19 are accommodated in the accommodating space in exterior packaging member 10, the accommodating space is sealed by sealing section 16 from the outside of the battery. Then, as illustrated in FIG. 5H, a part of the outer circumference of exterior packaging member 10 is cut such that the external shape is trimmed.

Figure 5I:
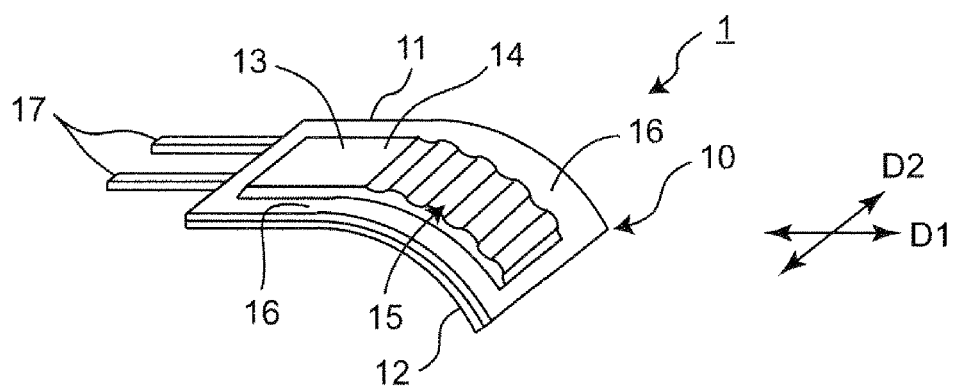
FIG. 5I is a view illustrating a process of the method of manufacturing the curved pouch-type battery of the embodiment.

Next, as illustrated in FIG. 5I, curve shaping is performed such that exterior packaging member 10 has the curved shape in first direction D1. In this manner, curved pouch-type battery 1 having the curved shape in first direction D1 is completely made. Here, a curve shaping process will be specifically described with reference to views illustrating processes in FIG. 7A to FIG. 7D.

As illustrated in FIG. 7A to FIG. 7D, curve shaping apparatus 30 which is used in the curve shaping process includes mounting base 31 on which exterior packaging member 10 is mounted, pressing member 32 that holds the flat section of exterior packaging member 10 which is caused to be interposed between mounting base 31 and pressing member 32, and curved die 33 having a curved shape. Curved die 33 has a curved shape corresponding to the curved shape (curved shape of a finished product of the battery) including cup section 13 of first film member 11. In addition, mounting base 31 has a mounting surface matching the curved shape of second film member 12. Exterior packaging member 10 is interposed and pressed between the mounting surface of mounting base 31 and curved die 33 such that exterior packaging member 10 is shaped to have the curved shape.

The method of manufacturing curved pouch-type battery 1 described with reference to FIG. 5A to FIG. 5I is provided as an example and another method or another apparatus may be used to manufacture the curved pouch-type battery. For example, in the curve shaping process, the curve shaping is performed by mounting the exterior packaging member on a mounting base having a curved surface and pressing the exterior packaging member such that the exterior packaging member matches the curved surface while a roller is caused to move.

Figure 8A:
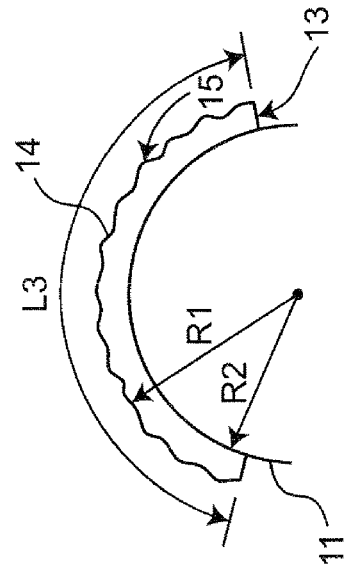
FIGS. 8A and 8B are views illustrating the corrugation structure (having a flat shape and a curved shape).
Figure 8B:
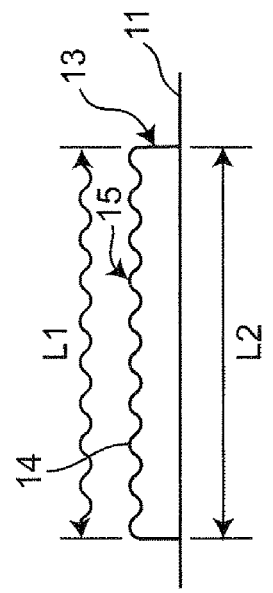

Here, FIG. 8A schematically illustrates a view of first film member 11 having the flat shape, which includes cup section 13 having corrugation structure 15 and FIG. 8B schematically illustrates a view of first film member 11 having the curved shape.

As illustrated in FIGS. 8A and 8B, in the curved shape of exterior packaging member 10, radius of curvature R1 of top surface 14 of cup section 13 is greater than radius of curvature R2 of the surface of first film member 11 in sealing section 16 on the peripheral side of cup section 13. In curved pouch-type battery 1 of the present embodiment, corrugation structure 15 is provided on top surface 14 of cup section 13 in advance at the time of having the flat surface. In this manner, surface length L1 of top surface 14 of cup section 13 in first direction D1 becomes elongated (that is, further elongated than that in a case where corrugation structure 15 is not provided, or elongated more than surface length L2 in sealing section 16 on the peripheral side of cup section 13). Further, such corrugation structure 15 is configured to have the plurality of concave portions 15a and convex portions 15b which extend in second direction D2 intersecting with first direction D1 corresponding to a curve direction.

In this manner, when exterior packaging member 10 is bent in first direction D1, a height of corrugation (concave portion 15a and convex portion 15b) is decreased and a pitch between corrugations is increased in first direction D1 in corrugation structure 15 on top surface 14 of cup section 13. As a result, it is possible to suppress a force which causes the surface of sealing section 16 on the peripheral side of cup section 13 to contract in first direction D1. Accordingly, when the curved shape is shaped, it is possible to suppress wrinkling of the surface of sealing section 16 in first film member 11. In particular, it is preferable that surface length L1 (a developed length of the concave and convex portions corresponding to a length of a concave and convex surface of corrugation structure 15) of top surface 14 of cup section 13 at the time of having the flat shape is set to be greater than curved length L3 (circumferential length with no consideration of the concave and convex surface of corrugation structure 15) of cup section 13 at the time of having the curved shape. When the curve shaping is performed, it is possible to sufficiently elongate top surface 14 of cup section 13 in first direction D1 and thus, it is possible to effectively suppress a force which causes the surface of sealing section 16 on the peripheral side of cup section 13 to contract in first direction D1.

In addition, corrugation structure 15 is provided on top surface 14 of cup section 13 of first film member 11, which is the surface of the outermost layer of the curved shape in exterior packaging member 10 and thereby, it is possible to suppress a force which causes a surface of a layer positioned inside the outermost layer at the time of having the curved shape, not to be generated. Accordingly, it is possible to suppress wrinkling of the surface of second film member 12 in exterior packaging member 10. Surface length L1 of top surface 14 of cup section 13 can be set to a desirable length by adjusting the corrugation height, the interval pitch, or the like, of concave portion 15a and convex portion 15b which constitute corrugation structure 15.

According to curved pouch-type battery 1 of the present embodiment, even in the case where exterior packaging member 10 has the curved shape in first direction D1, corrugation structure 15 is provided on top surface 14 of cup section 13 and thereby, it is possible to suppress wrinkling of a portion other than top surface 14 of cup section 13. In particular, since it is possible to suppress unpredictable wrinkling of the surface of sealing section 16 which is the bonding section between first film member 11 and second film member 12 during the curve shaping, it is possible to improve reliability of the sealing of exterior packaging member 10 having the curved shape. In addition, curved pouch-type battery 1 also has a good external appearance.

In addition, even after the first film member is curved in first direction D1, top surface 14 of cup section 13 of first film member 11 has corrugation structure 15 and concave portions 15a and convex portions 15b which constitute corrugation structure 15 are provided to extend in second direction D2 intersecting with first direction D1 as the curve direction. Hence, it is possible to impart some structural flexibility in first direction D1 to the curved shape. For example, even in a case where an external force which causes the exterior packaging member to be further curved in first direction D1 is applied to exterior packaging member 10, the structural flexibility can absorb the external force and it is possible to suppress stress in sealing section 16 or the like. From such a perspective, it is possible to improve reliability of the sealing of exterior packaging member 10. In addition, since concave portion 15a and convex portion 15b of corrugation structure 15 extend in second direction D2, strength in second direction D2 is improved. Further, when the battery is discharged, a temperature of the battery itself is increased. However, since a surface area is increased due to corrugation structure 15, heat dissipation is improved.

Planar Pouch-Type Battery

As the pouch-type battery according to an embodiment of the present disclosure, the curved pouch-type battery having the curved shape is described; however, the present disclosure can also be applied to a planar pouch-type battery which does not have the curved shape. Here, a configuration of the planar pouch-type battery having a planar shape, as the pouch-type battery according to another embodiment of the present disclosure, will be described with reference to a view of an external appearance in FIG. 9. In planar pouch-type battery 71 in FIG. 9, the same reference sign is assigned to the same components as in curved pouch-type battery 1 in FIG. 4 and description thereof is omitted.

Figure 9:
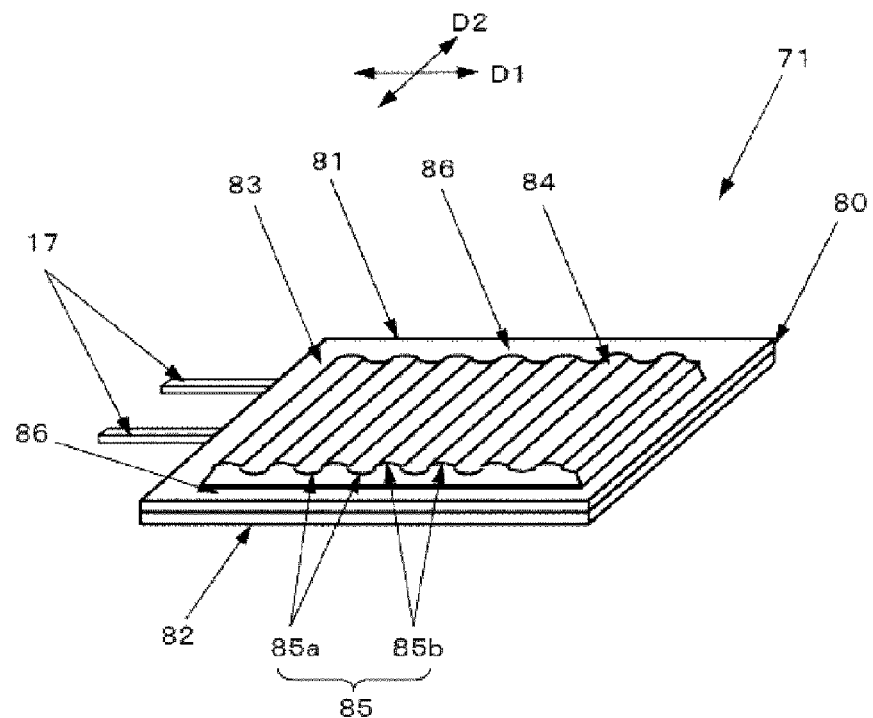
FIG. 9 is a view illustrating an external appearance of a planar pouch-type battery according to another embodiment of the present disclosure.

As illustrated in FIG. 9, planar pouch-type battery 71 includes exterior packaging member 80 in which first film member 81 and second film member 82 are bonded and inside which the accommodating space is formed, and a sheet-shaped electrode and an electrolyte liquid (electrolyte) which are accommodated in the accommodating space.

First film member 81 has cup section 83 of which the center portion is formed (formed as a recessed section toward the lower side) to protrude toward the upper side. The accommodating space is provided inside the cup section 83.

Top surface 84 (top surface of a protrusion shape and the bottom of the recessed section) of cup section 83 has corrugation structure 85 in which a plurality of concave portions 85a and convex portions 85b are alternately disposed. Specifically, the plurality of concave portions 85a and convex portions 85b are formed to extend from one end to the other end of top surface 84 in second direction D2. In addition, concave portions 85a and convex portions 85b are alternately disposed. In a configuration illustrated in FIG. 9, corrugation structure 85 is formed all over top surface 84; however, the corrugation structure may be partially formed on top surface 84. Further, the concave portions and the convex portions may be formed in a direction which is inclined to second direction D2.

Flat second film member 82 is overlapped with first film member 81 and first film member 81 and second film member 82 are bonded to each other around cup section 83. The bonding section becomes sealing section 86 with which the accommodating space is sealed from the outside of the battery and sealing section 86 is provided to be continuous in a quadrangular shape so as to completely surround (around the entire four sides of) cup section 83. The surfaces of first film member 81 and second film member 82 which constitute sealing section 86 are configured of flat surfaces on which neither the concave portion nor the convex portion is provided.

In this manner, in pouch-type battery 71, top surface 84 of cup section 83 of first film member 81 has the planar shape and a plurality of concave portions 85a and convex portions 85b are provided thereon. Further, sealing section 86 has the planar shape in first direction D1 and is configured of a flat surface on which neither concave portion nor convex portion is provided.

According to planar pouch-type battery 71 illustrated in FIG. 9, corrugation structure 85 is provided on top surface 84 of cup section 83 and thereby, it is possible to improve flexibility of exterior packaging member 80. Hence, even in a case where an external force is applied to bend exterior packaging member 80 and exterior packaging member 80 is deformed, it is possible to suppress wrinkling of a portion other than top surface 84 of cup section 83. In particular, since it is possible to suppress wrinkling of the surface of sealing section 86 which is the bonding section between first film member 81 and second film member 82 at the time of curving, it is possible to improve reliability of sealing of exterior packaging member 80. Examples of a case where the external force is applied to bend exterior packaging member 80 include not only a case where planar pouch-type battery 71 in the curved state by being applied with an external force is mounted on an apparatus, but also a case where an external force is temporarily applied to the planar pouch-type battery to temporarily cause elastic deformation thereof.

Modification Example of Embodiment

Figure 10:
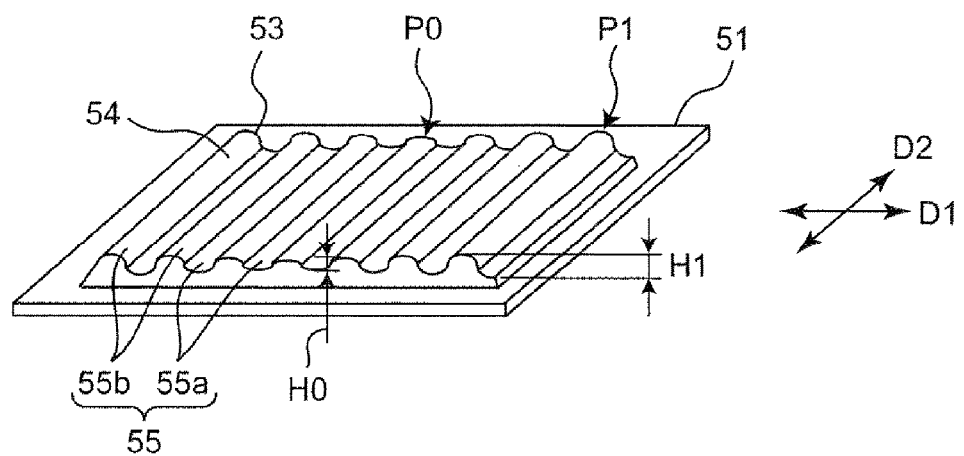
FIG. 10 is a view illustrating an external appearance of a first film member of a curved pouch-type battery according to a modification example of the embodiment.

Curved pouch-type battery 1 and planar pouch-type battery 71 according to the embodiments described above employ one configuration of the present disclosure and the pouch-type battery of the present disclosure can employ other various configurations. For example, FIG. 10 illustrates a configuration of cup section 53 of first film member 51 of a curved pouch-type battery as the pouch-type battery according to a modification example of the embodiments described above. FIG. 10 illustrates a state (that is, a flat shape state) before first film member 51 is curved.

As illustrated in FIG. 10, a plurality of concave portions 55a and convex portions 55b are provided on top surface 54 of cup section 53 to extend in second direction D2. These concave portions 55a and convex portions 55b are alternately disposed in first direction D1 and thereby corrugation structure 55 is provided on top surface 54.

In corrugation structure 55, the corrugation height is increased to be far from center portion P0 on cup section 53 in first direction D1. For example, corrugation height H1 (a height changing in a thickness direction) of concave portions 55a and convex portions 55b at end portion P1 in the first direction, which are far from center portion P0 in first direction D1 is set to be greater than corrugation height H0 at center portion P0.

Stress which causes contraction in first direction D1 during curve shaping becomes greater on a side of a position closer to end portion P1 in the first direction than of a position closer to center portion P0, around cup section 53. In corrugation structure 55, the corrugation height is set as above and thereby, it is possible to further elongate a surface length in first direction D1 in the vicinity of end portion P1 in the first direction than in the vicinity of center portion P0 and it is possible to suppress wrinkling at a position close to end portion P1 in the first direction.

Figure 11:
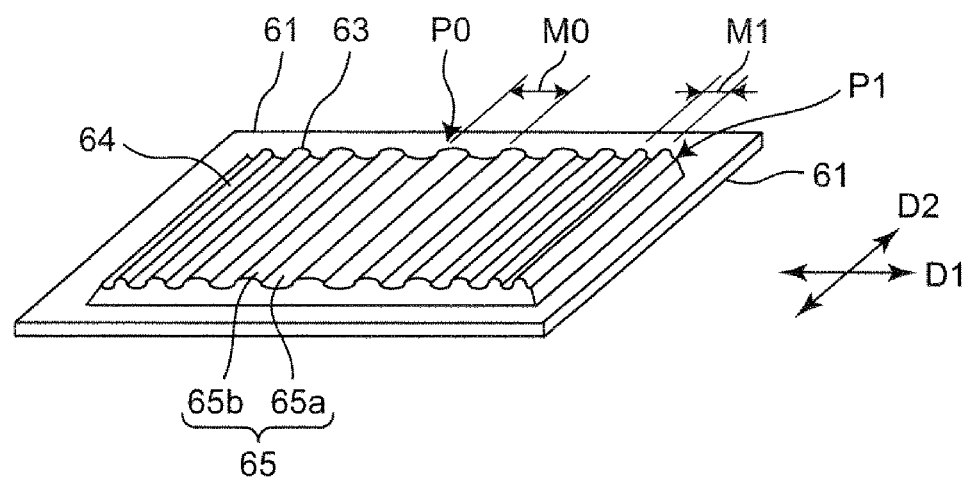
FIG. 11 is a view illustrating an external appearance of a first film member of a curved pouch-type battery according to another modification example of the embodiment.

In addition, from such a perspective, similar to first film member 61 illustrated in FIG. 11, corrugation structure 65 provided on top surface 64 of cup section 63 has a corrugation pitch at center portion P0, which is different from that at end portion P1 in the first direction and thereby, the surface length (developed length) maybe changed. Specifically, corrugation pitch (an interval between concave portions 65a or convex portions 65b) M1 in the vicinity of end portion P1 of corrugation structure 65 in the first direction is set to be narrower than corrugation pitch M0 in the vicinity of center portion P0 and thereby, it is possible to set the surface length (developed length) to be narrower in the vicinity of end portion P1 in the first direction.

The above embodiments are described in which the case where corrugation structure 15 provided on top surface 14 of cup section 13 is configured to have the plurality of concave portions 15a and convex portions 15b which extend from the one end to the other end of cup section 13 in second direction D2 is provided as an example. A structure in which wrinkling is suppressed during the curve shaping is not limited to only such a structure.

For example, when the concave portions or the convex portions are provided on the top surface of the cup section, it is possible to elongate the surface length (length of uneven surface, developed length) of the top surface in first direction D1. Such concave portions and convex portions are not limited to the case of extending in second direction D2; however, the concave portions or the convex portions having an unextended shape (for example, a circular shape) may be provided. In the case where the concave portions or the convex portions extend in a certain direction, the concave portions or the convex portions may be configured to be partially disconnected. The concave portions or the convex portions extend in any direction as long as the direction intersects with first direction D1 as the curve direction, and the direction is not limited to second direction D2 orthogonal to first direction D1.

The concave portions and the convex portions are not limited to being provided only on the top surface of the cup section but may be provided at another position on the surface of the film member.

In the exterior packaging member, the sealing section on the peripheral side of at least the cup section, that is, in first direction D1, is configured of a flat surface (surface without a concave portion or convex portion) on which neither the concave portion nor the convex portion is provided. In addition, it is preferable that the entire periphery of the cup section, that is, the entire sealing section, is configured of the flat surface on which neither the concave portion nor the convex portion is provided. The corrugation structure of the embodiments described above is provided on the top surface of the cup section and thereby, it is possible to suppress wrinkling of the sealing section configured of the flat surface such that it is possible to improve reliability of the sealing of the exterior packaging member.

Through an appropriate combination of any embodiments of the various embodiments described above, it is possible to achieve effects which are achieved in the respective embodiments.

The curved pouch-type battery of the present disclosure is useful in application to a portable electronic terminal including a built-in curved pouch-type battery, such as a wearable portable terminal.

What is claimed is:

1. A pouch-type battery comprising:
   a sheet-shaped electrode;
   an electrolyte; and
   an exterior packaging member having an accommodating space in which the electrode and the electrolyte are accommodated,
   wherein the exterior packaging member includes
      a first film member on which a cup section having the accommodating space inside is provided,
      a second film member disposed to face the first film member, the second film member not including concave portions or convex portions, and
      a sealing section around the cup section, with which the first and second film members are bonded to each other and the accommodating space is sealed, and
   wherein the cup section of the first film member has a top surface on which a plurality of concave portions or convex portions are provided and the sealing section is configured of a flat surface on which neither concave portion nor convex portion is provided, and wherein the accommodating space in the exterior packaging member has a curved shape at least in a first direction.

2. The pouch-type battery of claim 1, wherein the top surface of the cup section of the first film member has a curved shape and is provided with the plurality of concave portions or convex portions, and the sealing section has a curved shape in the first direction and is configured of the flat surface on which neither concave portion nor convex portion is provided.

3. The pouch-type battery of claim 1,
   wherein the top surface of the cup section of the first film member has a planar shape and is provided with the plurality of concave portions or convex portions, and the sealing section has a planar shape in a first direction and is configured of the flat surface on which neither concave portion nor convex portion is provided.

4. The pouch-type battery of claim 3,
   wherein the plurality of concave portions or convex portions extend in a second direction intersecting with the first direction, on the top surface of the cup section of the first film member.

5. The pouch-type battery of claim 4,
   wherein the plurality of concave portions or convex portions extend from one end to the other end of the top surface of the cup section of the first film member.

6. The pouch-type battery of claim 4,
   wherein the top surface of the cup section of the first film member has a corrugation structure in which the concave portions and the convex portions are alternately disposed in the first direction.

7. The pouch-type battery of claim 6,
wherein, in the corrugation structure of the top surface of the cup section of the first film member, a corrugation height on an end side is greater than a corrugation height at the center portion in the first direction.

8. The pouch-type battery of claim 6,
wherein, in the corrugation structure of the top surface of the cup section of the first film member, a corrugation pitch on an end side is narrower than a corrugation pitch at the center portion in the first direction.

* * * * *